Dec. 10, 1963     O. KARSTEN     3,114,063
MEANS FOR REDUCING THE STRAY LOSSES IN THE SPACE
BETWEEN THE COIL ENDS IN SYNCHRONOUS GENERATORS
Filed Sept. 19, 1960
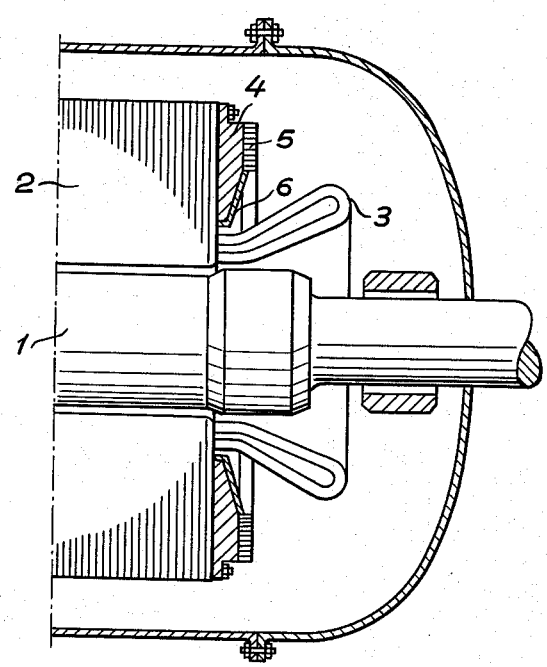
INVENTOR.
OLAV KARSTEN
BY
Bailey, Stephens & Huettig
ATTORNEYS

United States Patent Office 3,114,063
Patented Dec. 10, 1963

3,114,063
MEANS FOR REDUCING THE STRAY LOSSES IN THE SPACE BETWEEN THE COIL ENDS IN SYNCHRONOUS GENERATORS
Olav Karsten, Vasteras, Sweden, assignor to Allmänna Svenska Elektriska Aktiebolaget, Vasteras, Sweden, a Swedish corporation
Filed Sept. 19, 1960, Ser. No. 56,960
Claims priority, application Sweden Sept. 26, 1959
2 Claims. (Cl. 310—256)

The present invention relates to means for reducing the stray losses which arise in the space between the coil ends in synchronous generators.

The stray losses which arise in the space between the coil ends in synchronous generators are particularly disturbing in large 2-pole turbo-generators, especially with high utilization. In order to reduce these losses, either a metal screen or a magnetic lamination is placed on the thrust collar of the stator. These known means, however, have considerable disadvantages.

The metal screen operates in such a way that the stray flux from the coil ends induces currents in the metal screen, these induced currents giving rise to a magnetomotive force in the metal screen in the opposite direction, which limits the stray flux. When, however, this is generated by very large currents in the coil ends and limited by a relatively long air path, very large currents are required in the metal screen in order to appreciably limit the said stray flux, and these currents in the screen cause in their turn considerable losses.

The magnetic laminations on the thrust collar are provided to limit the eddy current losses appearing in them, originating from the stray flux of the coil ends. However, the lamination decreases the effective air path of the stray flux and thus increases the stray flux, which brings about increased losses in the coil ends.

These disadvantages in the known devices are avoided by the present invention which is characterised in that a ring shaped screen of a metal with high electrical conductivity is placed on the inner part of the thrust collar of the stator and that a ring shaped body of laminated magnetic material is placed on the outer part of the thrust collar of the stator, concentric with and immediately outside the said metal screen.

By this new means a greater decrease in losses is attained than with the known arrangements. When the outer magnetic lamination offers an alternative way for the stray flux, a considerably smaller current is required in the inner metal screen to prevent the flux flowing through it. The ohmic losses in the metal screen are thus smaller. Because the magnetic lamination is placed further away from the rotor axle, the air path of the flux is lengthened so that the lamination cannot cause any increase in the stray flux, which is the case if the lamination covers the whole thrust collar.

From the manufacturing point of view the lamination can with advantage be made as a ring of grain oriented magnetic material.

The invention is described below with reference to the accompanying FIGURE which shows a section through part of a synchronous generator on which a means according to the invention is placed.

In the figure, the rotor of the synchronous generator is designated 1 and the stator 2. One of the ends of the coils found in the stator is indicated by 3, and the thrust collar which holds together the stator core, by 4. The metal screen situated on the inner part of the thrust collar is designated 6, and the magnetic lamination situated on the outer part of the thrust collar, 5.

The stray flux from the coil end 3 flows partly through the copper screen 6 and partly through the magnetic lamination 5. The part of the flux which flows through the metal screen 6 induces eddy currents in this. These currents cause a magnetomotive force in the opposite direction in the metal screen and divert the stray flux from the metal screen to the magnetic lamination. The outer magnetic lamination 5 thus offers an alternative way for the stray flux and much the greatest part of this flows through said lamination. The ohmic losses in the metal screen 6 thus become smaller because the flux through the screen, and therefore the eddy currents are decreased. The magnetic lamination 5, to which the stray flux is diverted from the metal screen 6 is at a considerable distance from the rotor axle and coil ends so that the stray flux and consequently the coil end losses do not increase because of a shortened air path for the stray flux.

I claim:
1. In a synchronous generator having a stator with a stator core, the axial ends of said stator core being provided with a thrust collar, an armature winding arranged in said stator core, said winding comprising coil ends extending axially from said stator core, said coil ends producing a stray flux, said flux giving rise to eddy current losses in said thrust collar, means for reducing said eddy current losses comprising a first ring-shaped body of laminated magnetic material and a second ring-shaped body of non-magnetic material of high electrical conductivity, said bodies being coaxial with said stator core and being arranged on said stator outside said thrust collar in an axial direction, said first body being substantially entirely radially outside said second body.

2. Means according to claim 1, characterised in that the ring shaped body of laminated magnetic material is made from grain oriented magnetic material which has been wound to form a ring shaped body.

References Cited in the file of this patent
UNITED STATES PATENTS
2,795,714    Baudry _____ June 11, 1957

FOREIGN PATENTS
549,650    Great Britain _____ Dec. 1, 1942